Oct. 30, 1934.   A. C. BECKER   1,978,398
GAS PRESSURE REGULATOR
Filed Oct. 12, 1929   3 Sheets-Sheet 1

INVENTOR
ALFRED CURT BECKER
BY
ATTORNEYS

Oct. 30, 1934.  A. C. BECKER  1,978,398
GAS PRESSURE REGULATOR
Filed Oct. 12, 1929   3 Sheets-Sheet 2
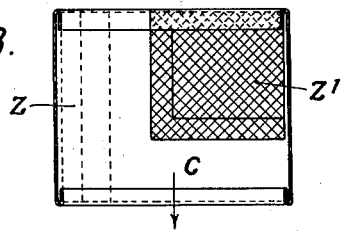
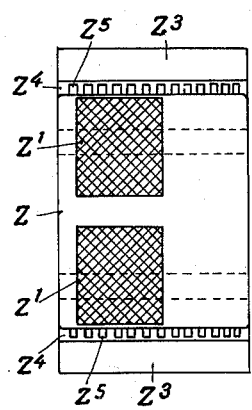
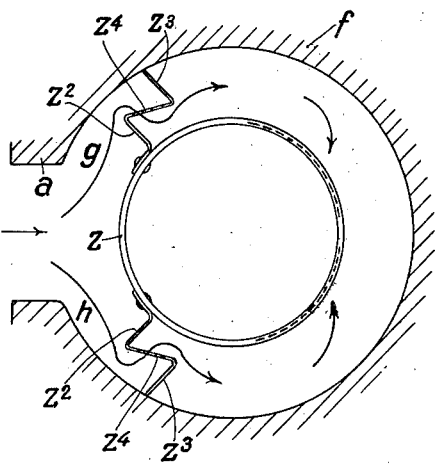
INVENTOR
ALFRED CURT BECKER
BY
ATTORNEYS Oct. 30, 1934.  A. C. BECKER  1,978,398
GAS PRESSURE REGULATOR
Filed Oct. 12, 1929  3 Sheets-Sheet 3

INVENTOR
ALFRED CURT BECKER
BY
ATTORNEYS.

Patented Oct. 30, 1934

1,978,398

UNITED STATES PATENT OFFICE 1,978,398

GAS-PRESSURE REGULATOR

Alfred Curt Becker, Oberschoeneweide, near Berlin, Germany

Application October 12, 1929, Serial No. 399,131
In Germany October 27, 1928

19 Claims. (Cl. 50—21)

This invention relates to gas pressure regulators and particularly to gas pressure regulators in which a passage for the gas to be used simultaneously forms a movable valve body which is carried by diaphragms of different size.

The invention resides therein that in such a gas pressure regulator and within the regulator casing up to the valve the cross sections for the passage of the gas do not have any substantial reduction in cross sectional area. Preferably the cross sectional areas of the gas passage in front of the valve are substantially increased. The movable valve seat, consisting of the gas passage, is also preferably enlarged so that the valve is provided with a large annular seat through which the gas can pass rapidly when opening the valve. The stationary valve seat, which if desired may be adjustable in the regulator casing, may preferably be provided above the movable valve.

The invention also has for its object to provide suitable means for adjusting the valve seat from the outside.

A further object of the invention is to conduct the gas to the valve seat in as pure a form as possible and that any impurities which may enter in spite of this can be readily conducted away with the gas stream.

A still further object of the invention resides therein that the breathing chamber can be closed against the outer air in a suitable manner without the regular operation of the breathing chamber producing such a closure, but this closure being produced by the incoming pressure gas.

Another object of the invention is the provision of a device which is adapted to relieve the regulator diaphragm exposed to the high pressure.

Finally the invention also includes a suitable device for protecting the parts of the regulator from damage during transport.

In the accompanying drawings the invention is illustrated by way of example.

Figure 2 is a section on the line A—B of a detail of Figure 1.

Figure 3 is a vertical section of this detail.

Figure 4 is a side elevation of the detail in Figure 2 seen from the right.

Figure 1:
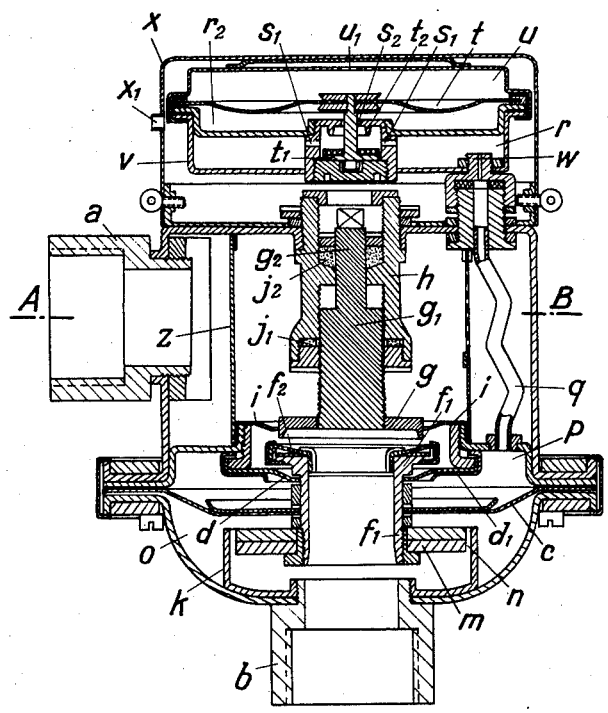
Figure 1 is a section of a device according to the invention.

In the accompanying drawings $a$ is a gas inlet, and $b$ is a gas outlet. $c$ is a large diaphragm and $d$ is a small diaphragm. $f$ is a gas passage supported by these diaphragms which at its upper end is provided with an enlargement $f_1$ which is provided with a covering $f_2$ of leather or other packing material. $g$ is a valve seat adjustably mounted in the regulator casing, but stationary during operation, this valve seat being plate shaped in order that the passage through the valve may be very large even when the valve has been opened only to a slight extent. The part $g_1$ connected to the valve plate $g$ is adjustable in the valve casing $h$ by screwing it up or down.

$g_2$ is an extension on the part $g_1$ which for example may be provided with a square portion so that a spanner may be fitted thereon in order to enable the valve plate $g$ to be adjusted relatively to the movable valve $f$, $f_1$ $f_2$. The parts $g_1$ $g_2$ are packed towards the outside by packings $j_1$ $j_2$.

It will be understood that a device may also be provided which is passed from the outside transversely to the direction of the part $g_2$ to this part in order to enable the valve seat to be adjusted directly from the outside.

$i$ is a ring which enables dirty water which has passed into the regulator casing as far as the valve to be conducted away over the plate $f_1$ through the gas outlet $f$ and entering the gas pipes located behind the regulator so that the regulator itself cannot be damaged by this dirty water.

The diaphragm $d$ exposed to the high pressure is directly secured in the regulator casing by means of a yielding annular plate or ring $d_1$ which is preferably springy so that the diaphragm is not pierced by rivet holes, screw holes or the like. The annular metal part extending inwardly is adapted to counteract or brake the action of the high pressure on the diaphragm $d$ and thus to relieve this diaphragm on the occurrence of higher pressures. By means of this relieving device the regulator will always produce the same consumption pressure even when substantial differences in the supply pressure occur.

$k$ is a cylindrical extension of the regulator casing underneath the diaphragm $c$. This extension together with the weight plates $m$ on the movable valve parts $f$, $f_1$ $f_2$ forms an annular passage $n$ which prevents the pressure in the chamber $o$ underneath the diaphragm $c$ from being reduced too much. The breathing chamber $p$ between the diaphragms $c$ and $d$ is connected by a bent pipe $q$ to a chamber $r$ which communicates with the chamber $r_2$ underneath a diaphragm $t$ by means of openings $s_1$ $s_2$. The chamber $u$ above the diaphragm $t$ communicates with the outer air through the openings $u_1$ and $x_1$. The casing or cap $x$ surrounding the chamber $u$ protects the diaphragm from the outside so that the diaphragm is not accessible from the outside although it is in communication with the outer air. The diaphragm $t$ is of such a size that it is capable of following the normal breathing movements of the chamber $p$ without the valve $t_1$ connected thereto reaching its valve seat $t_2$. This only occurs when gas under pressure enters the chamber $r_2$, this gas then lifting the diaphragm $t$ so that the valve $t_1$ $t_2$ is closed and the entire gas pressure does not come directly under the diaphragm $t$, because the valve $t_1$ $t_2$ is closed after a short increase in pressure. Should one of the diaphragms $c$ $d$ break it is impossible for the gas to pass through the breathing chamber to the outer air. The casing $v$ with the diaphragm $t$ can rock on a pivot $w$ so that after removing the cap $x$ the casing $v$ can be swung aside in such a manner that it is possible to reach the upper end $g_2$ of the stationary valve seat $g$ by means of a spanner in order to adjust the valve seat.

In Figures 2 to 4 $z$ is a sheet metal cylinder provided with screens $z_1$. On this cylinder are provided impinging surfaces $z_2$ $z_3$ which are connected together by an apertured connection $z_4$. As shown in Figure 2 the screens $z_1$ are provided on the side of the cylinder $z$ remote from the inlet $a$. The gas must, therefore, follow the path of the arrows shown in Figure 2 in order to reach the valve. In this manner a far reaching purification of the gas is obtained. The openings in the apertured connection $z_4$ are indicated at $z_5$ in Figure 4.

As will be seen from Figure 2 the impinging surfaces $z_2$ $z_3$ are so arranged that they form a zig-zag path for the gas.

Figure 5:
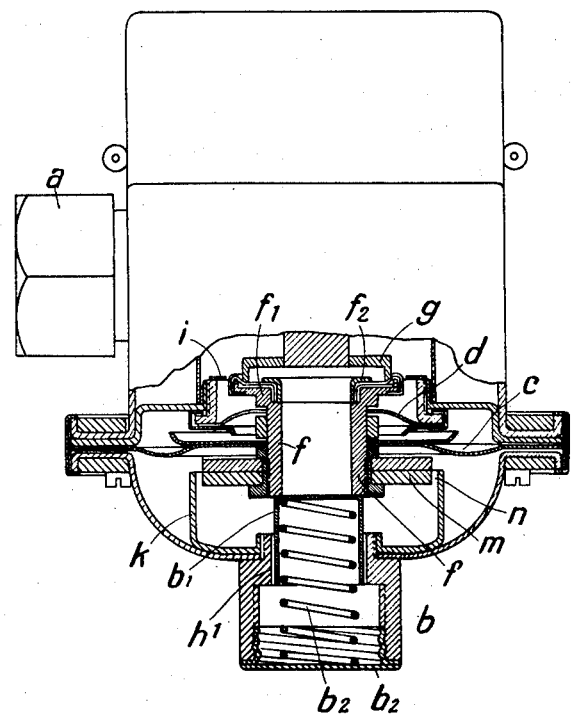
Figure 5 is a vertical section of a part of an appliance according to Figure 1 in combination with a protecting device for transport.

In Figure 5 $b_1$ is a cap which is pressed upwardly by a spring $b_2$. The spring $b_2$ bears at its other end against a screw cap $b_3$ which in turn is screwed into the inlet opening $b$. The cap $b_1$ bears against the lower end of the gas passage $f$ of the valve. The parts $b_1$—$b_3$ serve to press the valve plates $f_1$ $f_2$ against the stationary valve seat $g$ during storing and transport.

I claim:—

1. In a pressure regulator a casing, a movable valve member and a valve member which is stationary during the operation, an inlet pipe in said casing, a conducting passage between the said casing and the stationary and movable valve members, and impact surfaces in said passage which are adapted to conduct a fluid along serpentine paths in said passage, the passage being formed as an annular passage.

2. In a pressure regulator according to claim 1, the arrangement of the inlet in this passage in such a manner that the fluid is distributed in both halves of the annular passage.

3. In a pressure regulator according to claim 1, the provision of an inlet in this passage in such a manner that the fluid is distributed in both halves of the annular passage, impact surfaces being provided in both halves of the annular passage.

4. In a pressure regulator according to claim 1, an apertured intermediate member between two impact surfaces.

5. In a pressure regulator according to claim 1, an apertured intermediate member between two impinging surfaces, the impinging surfaces being so set that the intermediate member with the impinging surfaces are all Z shape.

6. In a pressure regulator, a casing, a valve and a valve seat located within said casing, an inlet for admitting fluid to said casing, a cylindrical body located in said casing, in combination with a passage for the fluid, a screen on the side of the cylinder remote from the inlet, impinging surfaces between the inlet and the screen, said impinging surfaces being adapted to conduct the fluid along serpentine paths in the annular chamber.

7. In a pressure regulator according to claim 6, an apertured connecting member between the impinging surfaces.

8. In a regulator a first chamber partly limited by movable controlling members, a second chamber communicating with the first chamber, a third chamber communicating with the outer air, the second and third chambers being provided in a common casing, a controlling member between the said second and third chambers, a valve on the controlling member, said valve being adapted to close the said first and second chambers relatively to one another when a fluid passes into the said first and second chambers, a carrier for said casing engaging said casing eccentrically and about which the casing can be rotated, a second casing with guide passages, a valve seat which is substantially stationary during the regulation, means on said valve seat adapted to adjust said valve seat from outside the casing, the means for adjusting the valve casing being substantially located centrally relatively to the first casing.

9. In a regulator a first chamber partly limited by movable controlling members, a second chamber communicating with the first chamber, a third chamber communicating with the outer air, the second and third chambers being provided in a common casing, a controlling member between the said second and third chambers, a valve on the controlling member, said valve being adapted to close the said first and second chambers relatively to one another when a fluid passes into the said first and second chambers, a carrier for said casing and engaging eccentrically therewith, said casing being adapted to be rotated about said carrier, a second casing with guide passages therein, a valve seat which is substantially stationary during the regulation, means on said valve seat adapted to adjust the valve seat from outside the casing, the means for adjusting the valve seat being located substantially centrally relatively to the first casing, and a cap adapted to be rigidly connected to the carrier for the first casing and to close said first casing.

10. In a gas pressure regulator, a valve, a fluid supply, carrying means adapted to carry the said valve and to be carried by said fluid, a chamber into which the fluid enters when the said carrying means become defective, a wall located between the said chamber and the open air and provided with an opening, a diaphragm adapted to be moved by the aid of fluid entering said chamber, and a valve carried by said diaphragm and adapted to close said opening.

11. In a gas pressure regulator, a valve, a fluid supply, carrying means adapted to carry the said valve and to be carried by said fluid, a chamber into which the fluid enters when the said carrying means becomes defective, a wall located between the said chamber and the open air and provided with an opening, and a controlling member adapted to close said opening and to be moved by the aid of fluid entering said chamber, a normally stationary valve seat, means adapted to adjust the valve seat from the outside, and a casing containing the said wall and the controlling member, said casing being normally central with respect to the means for adjusting the valve seat, but being movable out of the region of said means.

12. In a gas pressure regulator, a valve, a fluid supply, carrying means adapted to carry the said valve and to be carried by said fluid, a chamber into which the fluid enters when the said carrying means becomes defective, a wall located between the said chamber and the open air and provided with an opening, and a controlling member adapted to close the said opening and to be moved by the aid of fluid entering said chamber, a normally stationary valve seat, means adapted to adjust the valve seat from the outside, a common casing in which said wall and the controlling member are contained, said casing being normally arranged centrally to the means for adjusting the valve seat but being adapted to be removed out of the region of said means, and a support for said casing, adapted to guide the fluid and arranged eccentrically on said casing.

13. In a gas pressure regulator, a valve, a fluid supply, carrying means adapted to carry the said valve and to be carried by said fluid, a chamber into which the fluid enters when the said carrying means becomes defective, a wall located between the said chamber and the open air and provided with an opening, and a controlling member adapted to close the said opening and to be moved by the aid of fluid entering said chamber, a normally stationary valve seat, means adapted to adjust the valve seat from the outside, a common casing in which said wall and controlling member are contained, said casing being normally arranged centrally to the means for adjusting the valve seat but being adapted to be removed out of the region of said means, a support for said casing, adapted to guide the fluid and arranged eccentrically on said casing, and a cap provided with a breathing opening and adapted to be rigidly connected to the said carrying means and to enclose said casing.

14. In a gas pressure regulator, a valve, a fluid supply, carrying means adapted to carry the said valve and to be carried by said fluid, a chamber into which the fluid enters when the said carrying means become defective, a wall located between the said chamber and the open air and provided with an opening, and a diaphragm adapted to close the said opening and to be moved by the aid of fluid entering said chamber.

15. In a gas pressure regulator, a valve, a fluid supply, carrying means adapted to carry said valve and to be carried by said fluid, a chamber into which the fluid enters when the said carrying means becomes defective, a wall located between the said chamber and the open air and provided with an opening, a controlling member adapted to close the said opening and to be moved by the aid of fluid entering said chamber, the arrangement of the said wall and the controlling member in a common casing, and a support for the casing engaging said casing eccentrically and about which the casing can be turned.

16. In a pressure regulator, a casing, means for the entrance and exit of a fluid, a valve having a valve seat, a means for adjusting said valve seat from the outside of said casing by means of a member extending through said casing, a further means for covering said first-named means in such a manner that the first-named means can only be adjusted after removal of the covering means.

17. In a pressure regulator, a valve body having a large passage therein, a large diaphragm, a small diaphragm, said diaphragms being adapted to actuate said valve body, a regulator casing, a supply pipe connected to said regulator casing for supplying a fluid, a valve seat cooperating with said large passage and adapted to close the same, a fluid converging means between the said supply pipes and the said valve seat, the cross-sectional area of said means being substantially equal to the cross-section of the said supply pipe, a chamber which on one side is shut off from the large diaphragm, an outflow pipe, and a narrow connecting passage between the outflow pipe and the said chamber.

18. In a pressure regulator, a valve body having a large passage therein, a large diaphragm, a small diaphragm, said diaphragms being adapted to actuate said valve body, a regulator casing, a supply pipe connected to said regulator casing for supplying a fluid, a valve seat cooperating with said large passage and adapted to close the same, a fluid converging means between the said supply pipes and the said valve seat, the cross-sectional area of said means being substantially equal to the cross-section of the said supply pipe, a chamber which is shut off on one side from the large diaphragm, a cylindrical portion in the said chamber, a plate-shaped enlargement on the movable valve body, and a narrow passage between the cylindrical portion and the plate-shaped enlargement.

19. In a regulator according to claim 14, the arrangement of the diaphragm in such a manner that it is covered toward the outside.

ALFRED CURT BECKER.